US012640033B2

(12) United States Patent
Houssami

(10) Patent No.: US 12,640,033 B2
(45) Date of Patent: *May 26, 2026

(54) PACE DELINEATION JIBE IOTA

(71) Applicant: Rami B. Houssami, Herndon, VA (US)

(72) Inventor: Rami B. Houssami, Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/236,306

(22) Filed: Aug. 21, 2023

(65) Prior Publication Data

US 2024/0233522 A1     Jul. 11, 2024

Related U.S. Application Data

(63) Continuation of application No. 17/373,077, filed on Jul. 12, 2021, now Pat. No. 11,735,040, which is a continuation of application No. 16/866,340, filed on May 4, 2020, now Pat. No. 11,062,596, which is a continuation of application No. 15/497,124, filed on Apr. 25, 2017, now Pat. No. 10,643,464.

(60) Provisional application No. 62/326,833, filed on Apr. 25, 2016.

(51) Int. Cl.

| | |
|---|---|
| *G08G 1/01* | (2006.01) |
| *B60W 30/00* | (2006.01) |
| *G05D 1/00* | (2006.01) |
| *G08G 1/052* | (2006.01) |
| *G08G 1/08* | (2006.01) |
| *G08G 1/16* | (2006.01) |
| *H04W 84/00* | (2009.01) |

(52) U.S. Cl.
CPC ........... *G08G 1/0145* (2013.01); *B60W 30/00* (2013.01); *G05D 1/021* (2013.01); *G08G 1/0112* (2013.01); *G08G 1/052* (2013.01); *G08G 1/08* (2013.01); *G08G 1/164* (2013.01); *G08G 1/166* (2013.01); *H04W 84/00* (2013.01)

(58) Field of Classification Search
CPC .... G08G 1/0145; G08G 1/0112; G08G 1/052; G08G 1/08; G08G 1/164; G08G 1/166; B60W 30/00; G05D 1/021; H04W 84/00
See application file for complete search history.

(56) References Cited

U.S. PATENT DOCUMENTS

| | | | | |
|---|---|---|---|---|
| 9,841,287 | B1 * | 12/2017 | Hayward | ......... G08G 1/096783 |
| 2006/0181433 | A1 * | 8/2006 | Wolterman | ............ G08G 1/164 |
| | | | | 340/905 |

* cited by examiner

*Primary Examiner* — Sisay Yacob
(74) *Attorney, Agent, or Firm* — Fish & Richardson P.C.

(57)     ABSTRACT

With the aim of contributing to the optimization of commuting systems, roadways, and other motion systems, Pace Delineation jibe iota (PD) addresses the issue of crossing paths of travel. PD is the process of gathering and analyzing velocities, positions, and other parameters and properties of traversing units to determine the velocities of each such that they do not arrive at the intersections at the same time. Such coordination can help avoid the stoppage of vehicles at an intersection, and collisions obviously. The process also accommodates an overtaking condition which may be used to prioritize emergency responders or other traversals.

4 Claims, 6 Drawing Sheets

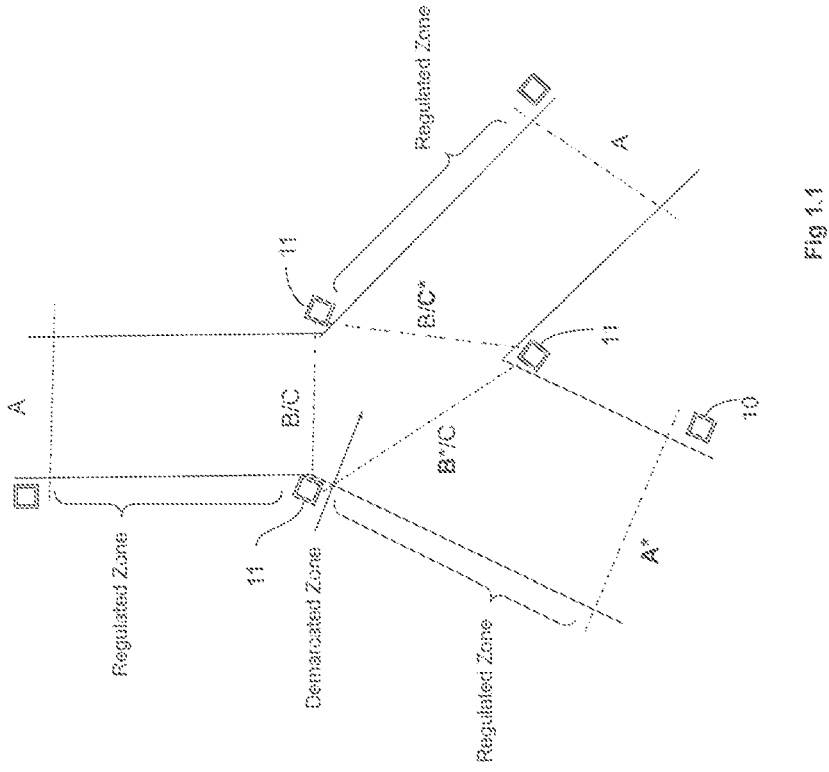
Fig 1.1
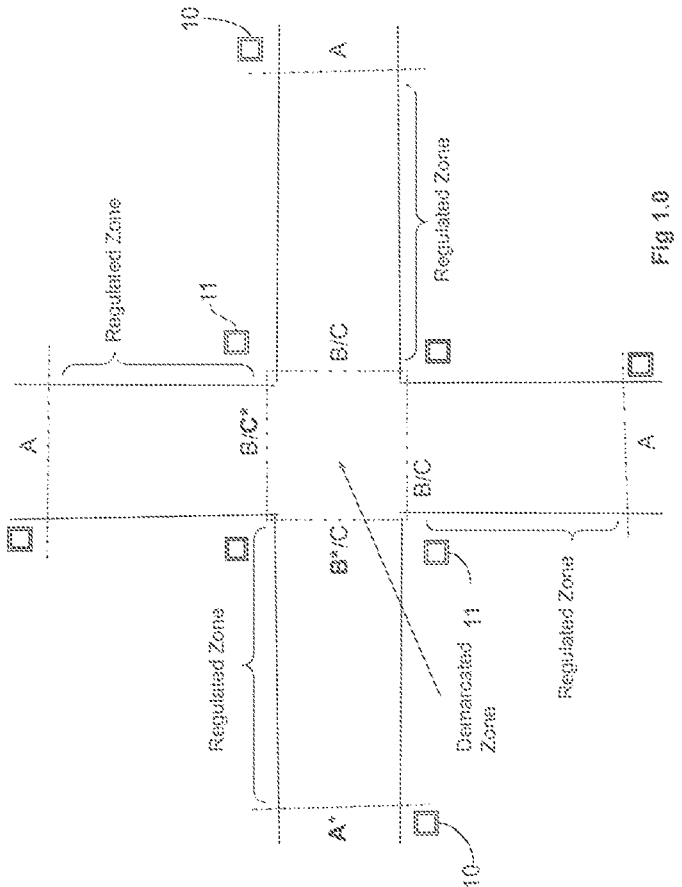
Fig 1.0

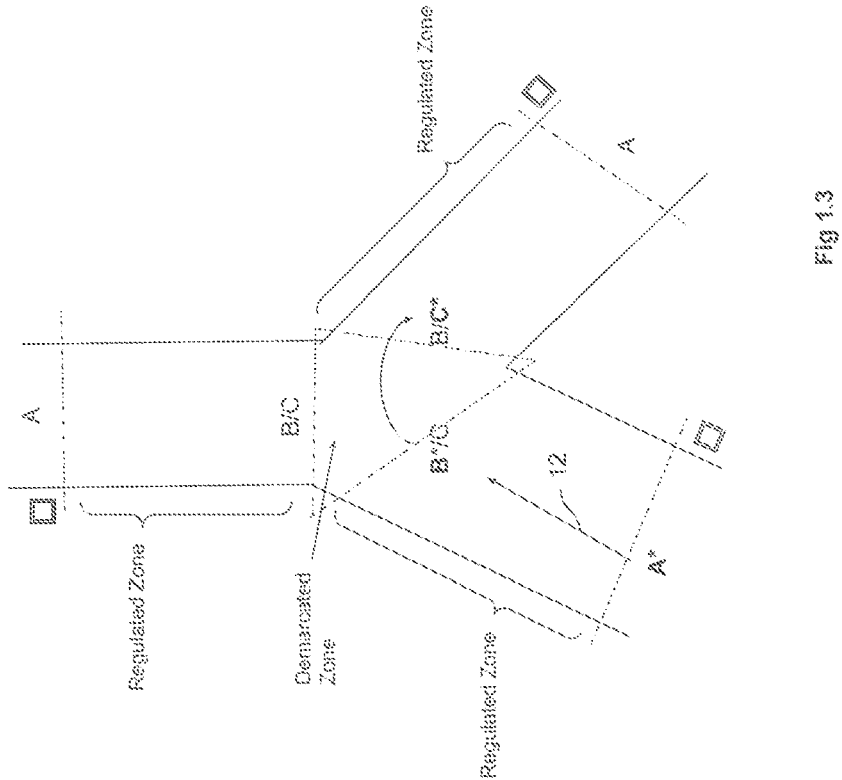
Fig 1.3
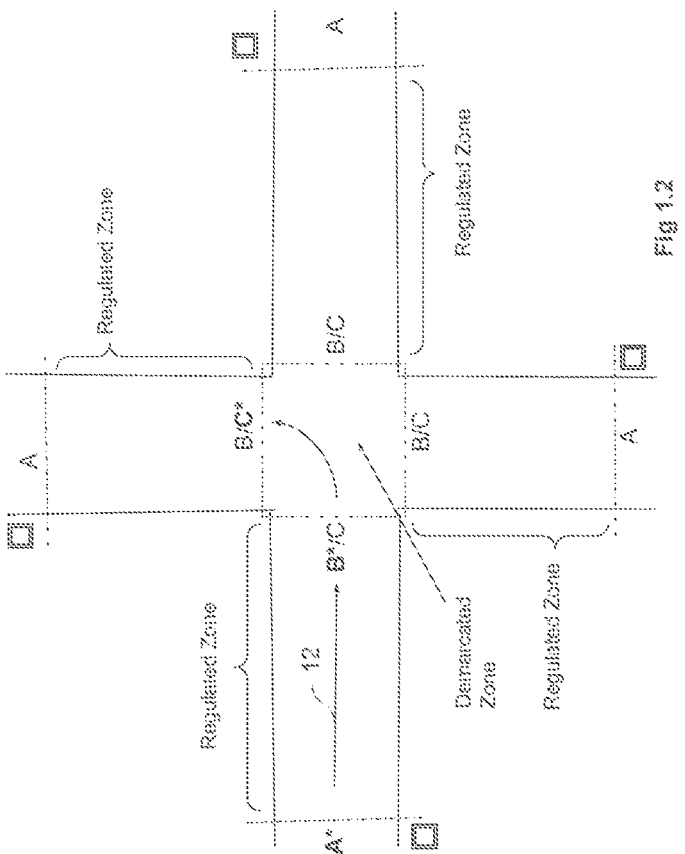
Fig 1.2

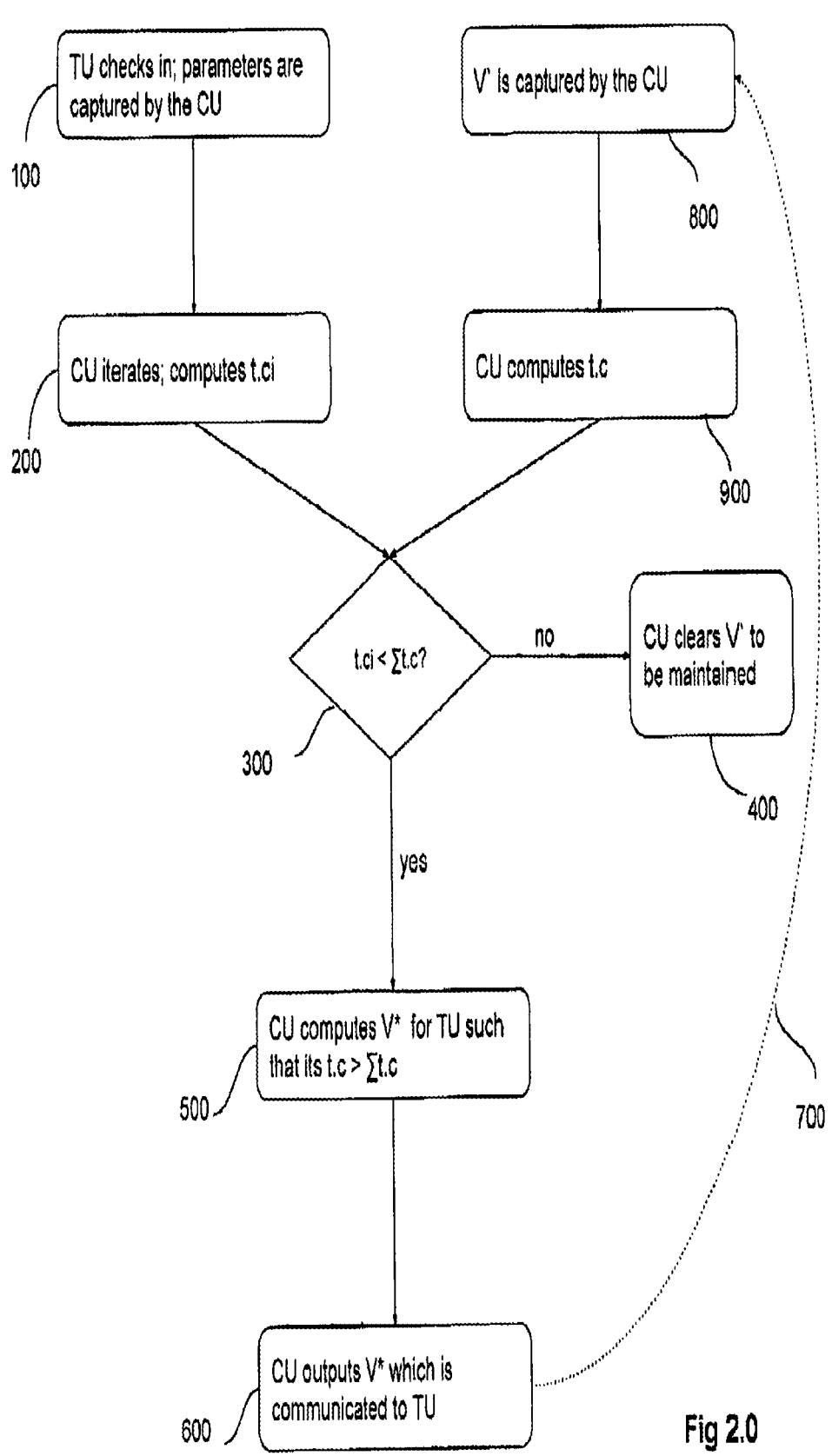
Fig 2.0

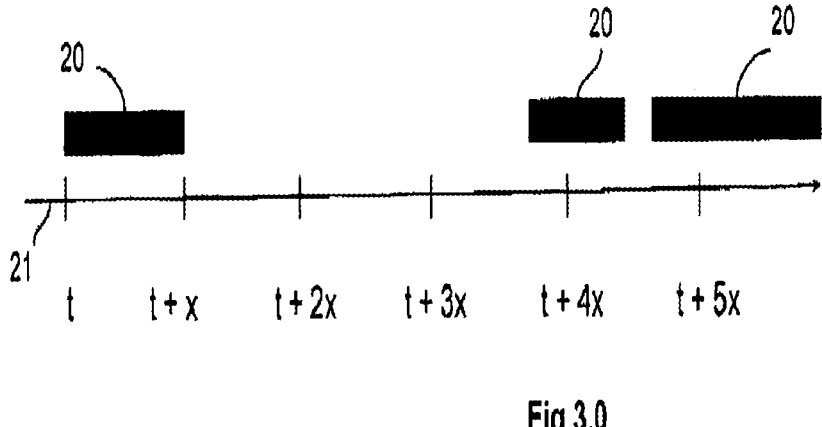
20
20
20
21
t    t + x    t + 2x    t + 3x    t + 4x    t + 5x
Fig 3.0
22
t    t + x    t + 2x    t + 3x    t + 4x    t + 5x
Fig 3.1

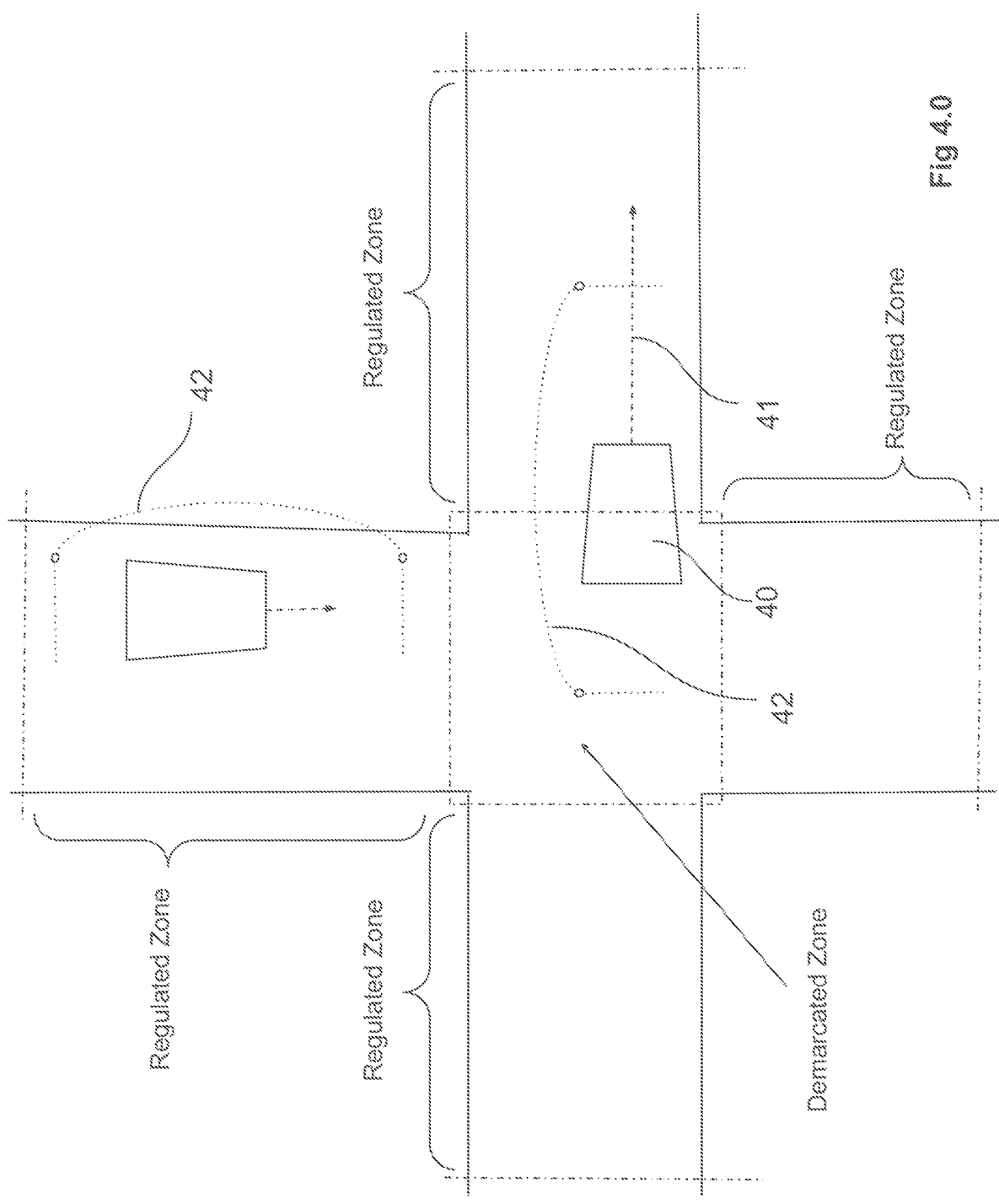
Fig 4.0

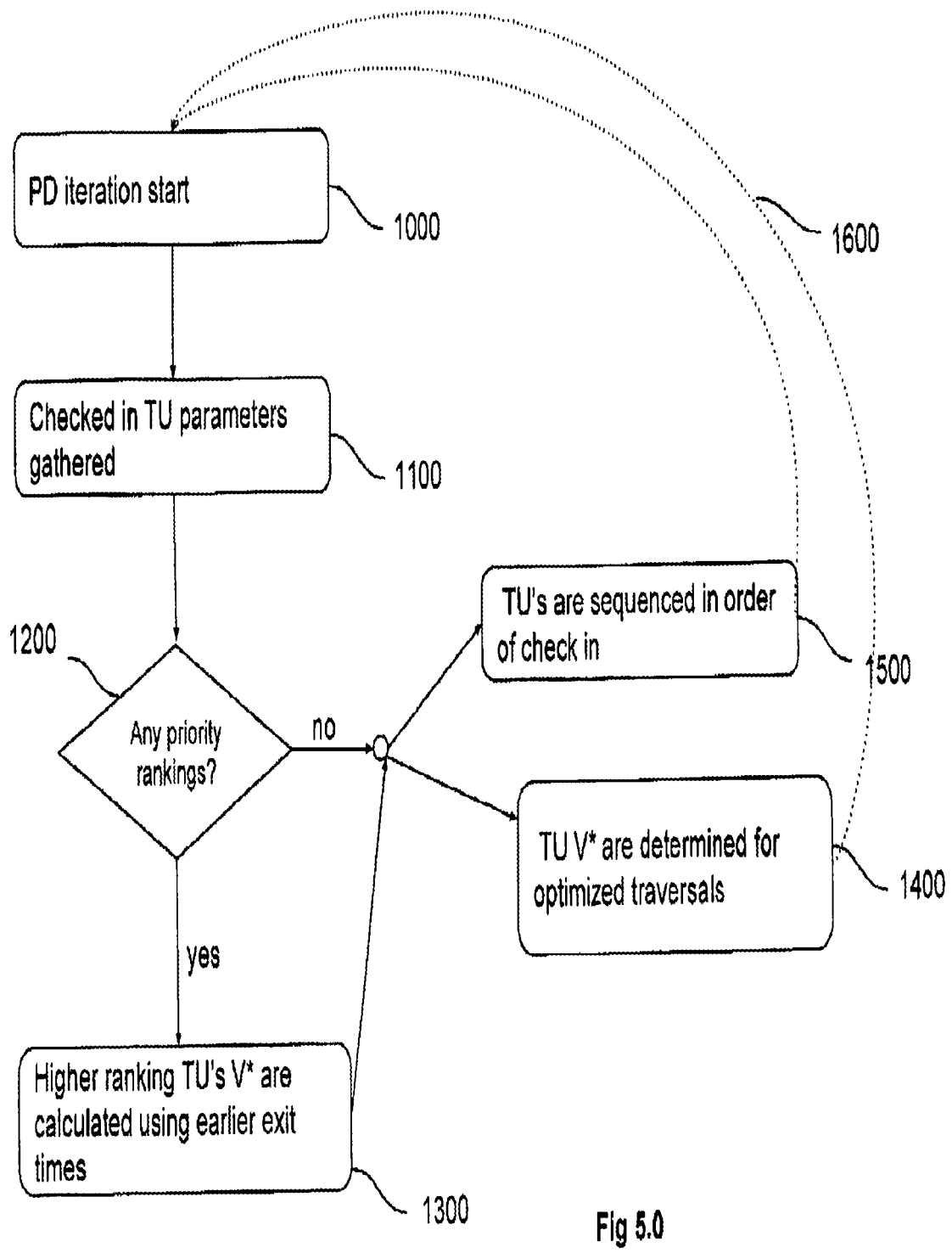
PD iteration start          1000
Checked in TU parameters gathered          1100
1200          Any priority rankings?
no          TU's are sequenced in order of check in          1500
yes
TU V* are determined for optimized traversals          1400
Higher ranking TU's V* are calculated using earlier exit times          1300
1600
Fig 5.0

PACE DELINEATION JIBE IOTA

CROSS-REFERENCE TO RELATED APPLICATIONS

This application is a continuation of U.S. application Ser. No. 17/373,077 filed Jul. 12, 2021 (now U.S. Pat. No. 11,735,040), which is a continuation of U.S. application Ser. No. 16/866,340, file May 4, 2020 (now U.S. Pat. No. 11,062,596), which is a continuation of U.S. patent application Ser. No. 15/497,124, filed Apr. 25, 2017 (now U.S. Pat. No. 10,643,464), which claims the benefit of U.S. Provisional Application No. 62/326,833, filed Apr. 25, 2016. The contents of the prior applications are incorporated herein by reference.

BACKGROUND

The process herein described coordinates the velocities of traversing units across a demarcated zone where paths of different units intersect such that collision and stoppage of the traversing units are avoided.

BRIEF SUMMARY

Pace Delineation jibe iota (PD) is a process for jibing the velocities of traversing units, such as autonomous vehicles, through an intersection as to avoid collision and stoppage. With the increasing utility of autonomous vehicles, the capability to efficiently and safely cross intersections with the least complications would likely enhance that utility. Such a method can be accomplished using different types of communications protocols and straightforward computations and formulas. By utilizing communication channels between a central controller or temporary host, and the Traversing Units (TU's), and/or sufficiently equipped infrastructure, along with the along with the sharing of data pertinent to compartmentalizing the crossing of the Demarcated Zone (DZ), the PD process can be a robust and effective way to increase the efficiency of intersection traversal, and easily accommodate the prioritization of emergency vehicles, responders, and others. Usage can range from aiding automated logistics systems to applications in Infrastructure as a Platform (IAP), Vehicular communication systems, vehicle ad hoc networks (VANETs).

BRIEF DESCRIPTION

PD is accomplished by using defined distances, velocities of the TU's intended path to calculate the time required to traverse the DZ in its entirety, then deriving an adjusted velocity for each TU such that the time within the DZ is distinguished and does not coincide with any other TU's or its margins. The calculations require distance parameters which are provided by PD-components that may be embodied by appropriately configured vehicle-to-infrastructure (V2I), vehicle-to-vehicle (V2V) communications, vehicle-to-everything (V2X), VANETs, and other proximity or remote communication protocols The PD process distinguishes the crossing times by coordinating the velocities of the TU's such that they do not cross the DZ at the same time. The calculations may also account for universal margins defined by the a PD implementing system, such as safety margins added between each TU, or a TU's own margins which may simply take the form of length parameters and accommodate for protruding and non-permanent objects.

BRIEF DESCRIPTION OF THE FIGURES

FIG. 1.0 is a wireframe of a four-way intersection with an ideal PDC layout embedded as infrastructure components;

FIG. 1.1 is a wireframe of a three-way intersection with an idea PDC layout embedded as infrastructure components;

FIG. 1.2 is a wireframe of a four-way intersection displaying a pathway through the RZ & DZ, and highlighting the distance variables used in PD iterations;

FIG. 1.3 is a wireframe of a three-way intersection displaying a pathway through the RZ & DZ, and highlighting the distance variables used in PD iterations;

FIG. 2.0 is flow chart displaying an ideal procession of a PD iteration for sequential jibing, i.e. delineation in the order of checkin;

FIG. 3.0 a visualization of the data stored by a counting element (DZ counter) with three time ranges of occupancy;

FIG. 3.1 is a visualization of the data stored by a counting element (DZ counter) with three time slots of occupancy, and highlighting the range of vacancy and availability for traversal;

FIG. 4.0 illustrates the presence of virtual margins around traversing units; and FIG. 5.0 is a flow chart displaying an ideal procession of a PD iteration including a priority condition

DETAILED DESCRIPTION

The pace delineation process described herein addresses the problem of intersecting paths between objects in motion, such as autonomous vehicles on roadways or logistic transport units in a warehouse. It is with this description, the pace delineation jibe iota is disclosed within its most basic form, yet of such form that the scope of the invention and implementation will be fully conveyed to anyone skilled in the art.

Pace delineation is accomplished through a series of steps collecting, sending and receiving data transmissions, all of which may involve signal communications, computation, and condition validations executed by a software platforms that may reside on vehicles, infrastructure, or ad hoc networks. Data sources may come from GPS, near field, wifi, 5 g, V2X (Vehicle to everything), vehicle ad hoc networks (VANETs), and other vehicular communication systems or protocols. A PDC is a conceptual point but also take a physical form as sensor, RFID reader, 5 g signal communications device, or other electronic component that may relay the arrival of a TU at the point defining the distances used to calculate the adjusted velocities.

| | |
|---|---|
| Pace Delineation (PD) | The process herein described |
| Traversing Unit (TU) | A unit intended to pass through the demarcated zone |
| Demarcated Zone (DZ) | An area demarcated as the area TU's avoid being inside at the same time. The area where the travel paths of different TU's intersect. |
| PD Component (PDC) | A source representing and/or transmitting TU information used in the PD process. PDC outputs, whether from a sensor integrated within infrastructure, or stemming from accurate GPS coordinates, virtual V2V platforms, are primarily used to mark the location of a TU, its distance to the DZ, and the distance till it exits the DZ. The three PDC's types are a, b, and c, (FIG. 2) which mark a TUs full trajectory through a regulated zone. The distances between these points may be predetermined or derived on an ad hoc basis. |

-continued

-continued

| | |
|---|---|
| Regulated Zone (RZ) | The area consisting of the PDC layout and the travel paths of TU's, including the DZ. |
| Central Unit (CU) | The unit(s)/module that receives and facilitates the computation of pertinent variables, as well as the communication of computed outputs, such as adjusted velocities. The CU may either consist of, or leverage DZ-occupancy time values from a time counting mechanism. |
| Adjusted Velocity | The velocity calculated by the CU such that a TU does not enter the DZ while its occupied. |
| DZ counter | a mechanism that continuously stores and refreshes, and makes available the times a DZ is occupied. It may contain one sum of time a DZ will be reserved for preceding TU's at that instance in time, or an series of time slots represented by ranges of times when the DZ will be occupied or unoccupied which will include unoccupied times in-between occupied times. A dynamic log of time slots. |
| Occupied DZ | the state of the DZ when a TU or its margins, plus any universal margins if any, reside inside the DZ, or a DZ that has a TU(s) entering earlier than that of a later TU. |
| target_c | a TU's intended destination in terms of PDCs. The exit point of the DZ. |
| approbated velocity | signal output by the CU when the adjusted velocity equals the initial velocity ($V^* = Vi$). This term is conceptual signifying if an initial velocity $Vi$ does not require adjustment to traverse the DZ safely |
| priority ranking | a property of a TU that PD uses to prioritize its traversal through the DZ, where a high priority ranking for TUs, such as emergency vehicles or law enforcement, will validate the derivation of traversing times earlier than other TU's. |
| lead condition | the condition that specifies a TU does not have any preceding TUs, and hence its $V^*$ is calculated without the t.c ($\Sigma$t.c) of a preceding TU. This condition may not be maintained throughout the traversal. |
| overtake | results when the CU determines a traversal time slot ahead of another TU, regardless of the order of arrival. |
| checkin; checks in | a TU begins interacting with the regulated zone, conditionality's, initial velocity, target_c, priority ranking, and other parameters are captured at this step in the delineation process. |
| checkout; checks out | a TU, and the defined length margins fully exit clearing the DZ. Its relative time to clear (t.c) the DZ reaches zero. A signal useful to serve in the validation or evaluation of the state of the DZ. |

To facilitate the description of the PD process, below are two tables of key terms and variables used for this application.

| | |
|---|---|
| disAB | Distance from PDC_a to PDC_b, the area where a TU adjusts its speed |
| disBC | distance of the TU's target path from PDC_b to PDC_c, the area within the DZ |
| disAC | the total distance a TU travels within the regulated zone |
| disUm disTU_front disTU_rear | The total physical length of each TU plus any additional virtual margins uniquely defined for each TU. disUm is considered from the point that would first enter the DZ (some distance in front of the TU: disU_front) to the last point that exits the DZ (some distance behind the TU: disU_ear) Allowing for margins around the TU's physical dimensions allows to accommodate for protruding, non-permanent objects, changes to the vehicles dimensions, and safety. The front and rear variations are denoted on the left, and refer to the distance in-front of the physical dimensions, |
| $\mu$ | a global margin that may be added to all TU disUm's and hence affect respective target velocity calculations. |

| | |
|---|---|
| | $\mu$'s may be universally applied to all TUs, or premised on conditions, such as vehicle type, traffic density, whether conditions, and so on. |
| Vi | initial velocity of the TU as it enters the RZ at PDC_a |
| $V^*$ | adjusted velocity, calculated by the CU and relayed back to the TU |
| dis.$\Delta$s | the distance covered by a TU between the previous velocity and its adjusted velocity. |
| t.c | the time a TU clears the DZ such that its disUm and any appended $\mu$ is completely outside the DZ. |
| t.$\Delta$s | time passed or will pass between a TU's previously relayed velocity and its current velocity amid continuous adjustment |
| t.ci | a TU's time to clear the DZ based on its initial velocity (Vi), before adjustment |
| t.b | a TU's time to reach the DZ, i.e. time to reach PDC_b. |
| $\Sigma$t.c | the t.c of the last preceding TU at a moment of query. This is not to be understood as the sum of each distinct TU's t.c's but the t.c. of the last TU as this itself accounts for the t.c's of all TU's preceding it; a value that increases as TU's checkin yet is always counting down as units traverse. |

A PDC providing the position of a TU from entry to exit of an RZ, is important to signify the distances used to compute target velocities for TU's. Such sources may come from GPS, near field, wifi, 5 g, V2X (Vehicle to everything), vehicle ad hoc networks (VANETs), and other vehicular communication systems or protocols. A PDC is a conceptual point but also take a physical form as sensor, RFID readers, 5 g signal communications device, or other electronic components that may relay the arrival of a TU at the point defining the distances used to calculate the adjusted velocities. The layout provided in FIGS. 1.0 and 1.1 show a four-way and three-way intersection shows the conceptual layout of a PDC components a, b, and c where component 'a' is the entry point into the RZ. 'b' is the entry point into the DZ, and 'c' is the exit or check out area. As stated in the definitions table, PDC may be embodied by virtual platforms, ad hoc networks, so long as they convey the arrival of a vehicle, and represent the disAB, and disBC in some machine readable and transmittable form.

In FIGS. 1.0 and 1.1, objects 10 and 11 represent PDC embodiments as infrastructure components where 10 represents point PDC 'a' and 11 represents both PDC 'b' and 'c', to keep the diagram free from clutter. It is granted the same effects of this PDC layout as infrastructure may be extrapolated through virtual platforms, GPS coordinates, and other PDC data sources. Intuitively, one may note that the disAB is the very distance between PDC 'a' and PDC 'b', as shown in FIGS. 1.2 and 1.3 item number 12; and the same conclusion may be made about the disBC being the distance between PDC 'b' and 'c'.

A TU checks in at PDC 'a', and has the distance of disAB to adjust its velocity to the target velocity before reaching point 'b' which marks the beginning of the DZ. As TU's check in at PDC 'a', a DZ timing element will receive updated expected clearing times. The clearing times will be derived with respect to the velocities being approbated in PD. For the purpose of this disclosure, we will assume that check in occurs as the physical TU passes PDC 'a' triggering the check in. This results in the subtraction of two terms in the velocity derivations later (disU_front & $\mu$) because these distances will already be inside the RZ upon check in, and PD delineates such that these virtual margins do not intersect and are treated as part of TU's dimensions.

It is worth noting the PDC layout may be rearranged, not only tailored to each intersection, but different PDC layouts may occupy the same intersection to avoid having two vehicles traveling straight across the DZ yet not intersecting needing to adjust velocities. With different arrangements, pace delineation can be further customized, this herein provides simply the fundamental principles and functions of delineating velocities.

With an adequate PDC layout, attention is now placed on the role of the central unit (CU), and idealized electronic component that leverages the communications of TU properties, the DZ counter element, and acquired or predetermined distance parameters of the PDC layout, and facilitates the computation and transmittal of a target velocity for TU's.

The CU does not have to itself be a central or contiguous component, but should in aggregate perform the operations herein described. The role of CU may be embodied in distributed software, and in temporary manifestations, such as in the case of VANETs.

The CU's operations account for the parameters described such as disUm for TU's, $\mu$'s, the distance till its target_c, priority rankings, among others. These parameters are involved in the CU iteration. The flow chart in FIG. 2.0 shows the PD process at a high level for sequential jibing, the delineation of TU velocities preserving the order in which TU's checked in. In 100 the TU checks through one of the manifestations of PDC 'a', and the TU parameters described are captured via one of the communication channels described above. In 200 the CU initiates its iteration. In general, and from the perspective of the TU, one of the primary conditions is whether the t.ci (the time to clear to the DZ given the TUs initial velocity) is less than the current $\Sigma$t.c (t.c of the most recently traversing TU) captured in decision node 300. The implication here is that the TU with shorter (or earlier) t.c is that it will arrive at the DZ before preceding TU's, and out of order.

for TU's that do not meet this condition, the operation at 400, the CU approbates the Vi which may find similar manifestations as in the CU still calculates the TU's V* and concludes with the same velocity. Such a signal may even be interpreted by the TU to accelerate up until its t.c is as close as the virtual margins allow as to seal the gaps in the DZ counter's time logs. For TU's meeting the condition, and thus will be arriving at the DZ out of order given their Vi, the CU computes the target velocity V* for the respective TU at 500. The computation is:

$$V^* = \frac{disAB_{TU} - dc.\Delta s_{TU} - disTU_{front}}{\sum t.c \pm t.\Delta s_{TU}}$$

The term $disTU_{front}$ is subtracted if PDC 'a' is triggered by the physical TU at the beginning of point 'a' for checkin, because with this configuration, the TU checks in and its virtual margins in front are already inside the RZ. This assumes virtual margins are of reasonable length and do not exceed disAB. If a universal margin was applied, the $\mu$ front would also be subtracted in the numerator. The CU then outputs V* to the respective CU at 600 and the iteration resets with 700. It is assumed with this calculation that the dc.$\Delta_{TU}$ and the term t.$\Delta s_{TU}$ is provided by the TU, motion capture system, GPS, or other sensor system external to the PD process. The terms are provided here though they are dependent on the adjusted velocity from a pervious iteration. As a TU's V* is calculated for the first time, this term is null/zero as there is no change toward a an adjusted velocity.

$$V^*_{TU2} = \frac{disAB_{TU2} - dc.\Delta s_{TU2} - disTU2_{front} - \mu_{front}}{\sum t.c \pm t.\Delta s_{TU2}}$$

At 800 the process resembles the first iteration, with only the conceptual difference that the velocities captured are not at this point the initial velocities. Step 900 proceeds with the next iteration similar to 200. When V* is calculated again in subsequent iterations dc.$\Delta_{TU}$ and t.$\Delta s_{TU}$ can be used. Any TU's checking in while other TU's are already traversing will receive a V* calculated with respect to the $\Sigma$t.c of the last TU in sequence. For example if TU2 checks in while TU1 is traversing, the V* for TU2 is calculated using the formula:

$$V^*_{TU2} = \frac{disAB_{TU2} - dc.\Delta s_{TU2} - disTU2_{front}}{\sum t.c \pm t.\Delta s_{TU2}}$$

where $\Sigma$t.c=t.c$_{TU1}$

The preceding process make use of a mechanism fundamental to PD, and crucial to its execution, which is the DZ counter element. The DZ counter element may take form in electronic memory, local hardware flash or distributed systems, among other electronic storage solutions, and serves as a log of time ranges that represent the time a DZ is occupied. As with the other descriptions, herein is an idealized DZ counter for one DZ however an individual skilled in the art may apply this time ledger technique to multiple DZ's under one DZ counter, or multiple DZ counters to one DZ for various PD configurations.

The DZ counter is configured to receive time values that represent the times an area will be occupied by a traversing unit. These values may be stored as an array, indexed table, dictionary, data frame, or various other data formats. The time values for an occupied DZ will inherently go up as TU's check in, and count down as units traverse the DZ. A visualization of DZ counter values could look like is provided in FIGS. 3.0 and 3.1.

In FIG. 3.0, 21 is a timeline starting from t and extending to the right at some interval x. 20 represent the times a DZ will be unavailable for traversal, meaning any V* calculations must not use the times beneath a 20 block. These blocks do include virtual margins disUm as well as any p's imposed by the CU. FIG. 4.0 illustrates the extension of a virtual margins from, and affixed to, a TU; where 40 is a TU and 41 is the direction and magnitude of travel, and 42 is the virtual margin disUm. Any p imposed herein will be added to the the the 42's which directly affect the V*'s.

In sequential delineation, sequencing traversal by order of checkin, if a TU checks into a DZ with the DZ counters time log shown in FIG. 3.0, the time used to calculate V*mux would be greater than t+5x.

In optimized delineation, where V*'s are calculated to maximize traversal rates regardless of checkin order, we can find that a CU may sort out these time gaps by using a TU's Vi, to determine initial arrival time to the DZ, and its tc.i. This range can be paired with the gaps in occupied time ranges existing in the DZ counters time log where the gaps represent availability of the DZ. Pairing the respective TU's initial traversal time range (given its Vi) with available time range to traverse may be done by computing the differences between all TU's t.c and the next TU's arrival time which represents a duration of vacancy in the DZ. The difference between traversing TU's t.c and the next TU's arrival time may be paired with the initial traversal time range of a TU by searching the times of vacancy that are greater than the TU's traversal duration. The pairing of traversal durations with gaps between other traversals is best illustrated in FIG. 3.1 where 22 is the difference between two traversing units exit and entry times. V* may be calculated to minimize the change of velocity by running the computation on prospect time slots and determine which would require the least change from tc.i or Vi.

Two functions described above require one more flow chart depicting a PD iteration accounting for priority rankings and optimized delineation. The flow chart of FIG. 5.0 starts off with an PD initiation at 1000 and checked in TU parameters are gathered, including priority ranking, at 1100. With this iteration, the condition at 1200 validates potential priority rankings. Any V* being calculate for TU's meeting this condition can assume the lead condition shown in 1300 such that their tc.i virtually remains un changed or even decreases in duration as all subsequent TU's V* are derived from t.c's of preceding vehicles. If a priority vehicles V* is calculated with the lead condition, subsequent TU's V* will reflect this change. Any TU with the lead condition at that point is likely to become the second TU at 1500. However at 1400 through the optimized delineation, the original leading TU may be better off jibing with a slot based on the logic in paragraph 18 above.

PD sequence of occurrence highlights: The following describes PD process's, conditionality's, and sequence of occurrence.

A PD iteration is run; time in between iterations may vary, with an ideal implementation utilizing short time intervals between iterations; the number of TU's already checked in may vary, from zero or greater.

TU's check in and are sequenced in order of entering and interacting with the Regulated Zone.

Conditions determining computations: lead condition, an ideal implementation of PD would check for any priority ranking.

If no preceding TU's ($\Sigma t.c=0$) or if t.c of the TU>$\Sigma t.c$, i.e. the TU's Vi means TU reaches the DZ after the duration of the DZ's t.c ($\Sigma t.c$) then Vi may remain as V*, where Vi is an approbated velocity.

overtake condition: if t.ci is well earlier than TU's ahead sequentially, quicker TU may overtake a sequence number; this condition may also be met by emergency vehicles such as ambulances, fire & rescue, and law enforcement even when their initial time to clear is not earlier than proceeding TU's, earlier sequence numbers may be granted to such prioritized TU's.

sequenced condition: DZ is occupied at time of checkin

CU receives TU's Vi, target_c, margin dimensions (disUm), speeds rate of change

CU computes and relays V*'s to all checked in TU's, this jibe of the regulated zone is iterative and can be run continuously, with multiple iterations throughout a TU's traversal through the regulated zone.

CU calculates the adjusted velocity V* and relays the value(s) to the relative TU(s)

V*calculation: *a TU's* V*=(disAB−*dc.*$\Delta s$−disUm−$\mu$)÷($\Sigma t.c$±*t.*$\Delta s$)

*$\Sigma t.c$=the t.c of the preceding TU−time since original t.c was calculated the TU's t.c with no preceding TU's or TU's whose Vi does not bring the TU into the an occupied DZ: t.c=(disAC+disUm$_{rear}$+$\mu_{rear}$)÷(Vi)

When a TU checks out, the proceeding TU's V* calculations assume the free-form due to the now meeting the lead condition.

The following embodiments demonstrate different scenarios handled by Pace Delineation to aid in the conceptualization of the process; these scenarios now assume TU checkins when a virtual margin reaches PDC 'a'. Each variable below is followed by an underscore and sequence identifier.

i.e., Variable_source:

disUm_TU1front-to-back=the distance of TU1's margins (the first lead TU)

V*_TU2=the adjusted velocity for TU2 (the second sequenced TU)

Scenario 1—one TU, no preceding TU's, i.e.

TU1 checks in—meets lead condition

CU computes free-form:

$$t.c\_TU1 = \left(disAC\_TU1 + disUm\_TU1 front-to-back + \mu\right) \div (Vi\_TU1)$$

$$V^*\_TU1 =$$

$$(disAB\_TU1 - dc.\Delta s\_TU1 + disUm\_TU1 front) \div (t.c\_TU1 \pm t.\Delta s\_TU1)$$

CU computes/delineates V* till TU1 checks out

Scenario 2—two TU's,

TU1 checks in—meets lead condition

CU computes: t.c_TU1=(disAC_TU1+disUm_TU1front-to-back+$\mu$)÷(Vi_TU1)    V*_TU1=(disAB_TU1−dc.$\Delta s$_TU1+disUm_TU1front)÷(t.c_TU1±t.$\Delta s$_TU1)

TU2 checks in—meets sequenced condition

CU computes: V*_TU2=(disAB_TU2—dc.$\Delta s$_TU2+disUm_TU2front)÷($\Sigma t.c$_TU1±t.$\Delta s$_TU2)

CU delineates V*'s till TU's check out

Scenario 3—four TU's,

TU1 checks in—meets lead condition

CU computes: t.c_TU1=(disAC_TU1+disUm_TU1front-to-back+$\mu$)÷(Vi_TU1)

V*_TU1=(disAB_TU1−dc.$\Delta s$_TU1+disUm_TU1front)÷(t.c_TU1±t.$\Delta s$_TU1)

TU2 checks in—sequenced condition

CU computes: V*_TU2=(disAB_TU2—dc.$\Delta s$_TU2+disUm_TU2front)÷($\Sigma t.c$_TU1±t.$\Delta s$_TU2)

t.c_TU2=(disAC_TU2—dc.$\Delta s$_TU2+disUm_TUfront-to-back+$\mu$)÷V*_TU2

TU3 checks in—meets sequenced condition

CU computes: V*_TU3=(disAB_TU3−dc.$\Delta s$_TU3+disUm_TU3front+$\mu$)÷($\Sigma t.c$_TU2±t.$\Delta s$_TU3)

t.c_TU3=(disAC_TU3−dc.$\Delta s$_TU3+disUm_TU3front-to-back+$\mu$)÷V*_TU3

TU4 checks in—meets sequenced condition

CU computes: V*_TU4=(disAB_TU4−dc.$\Delta s$_TU4+disUm_TU4front+$\mu$)÷($\Sigma t.c$_TU3±t.$\Delta s$_TU4)

t.c_TU4=(disAC_TU4−dc.$\Delta s$_TU4+disUm_TU4front-to-back+$\mu$)÷V*_TU4

CU delineates V*'s till all TU's check out

Scenario 4—overtake condition—

TU1 checks in—meets lead condition

CU computes: t.c_TU1=(disAC_TU1+disUm_TU1front-to-back+$\mu$)÷(Vi_TU1)

V*_TU1=(disAB_TU1—dc.$\Delta s$_TU1+disUm_TU1front)÷(t.c_TU1±t.$\Delta s$_TU1)

TUambulance (TUamb) checks in—meets overtake condition

TUamb prioritized in next iteration, V*_TUamb calculated under lead condition CU computes:

9

$$t.c\_TUamb =$$

$$\left(disAC\_TUamb + disUm\_TUamb\,front{-}to{-}back + \mu\right) \div (Vi\_TUamb)$$

$$V^*\_TUamb = (disAB\_TUamb - dc.\Delta s\_TUamb + disUm\_TUambfront + \mu) \div$$

$$(t.c\_TUamb \pm t.\Delta s\_TUamb)$$

TU_1 now meets sequenced condition $$V^*\_TU1 = (disAB\_TU1 - dc.\Delta s\_TU1 + disUm\_TU1front + \mu) \div$$

$$\left(\sum t.c\_TUamb \pm t.\Delta s\_TU1\right)$$

$$t.c\_TU1 = (disAB\_TU1 - dc\Delta s\_TU1 + disUm\_TU1 + \mu) \div (V^*\_TU1)$$

CU delineates V*'s till TU's check out

What is claimed:

1. A computer-implemented method, comprising:

receiving, from a global positioning system, location information associated with a first traversing unit;

determining, by a processor, a first location of the first traversing unit using the location information;

determining, by the processor, a velocity that the first traversing unit is likely moving at;

determining, by the processor, whether the first traversing unit is likely to enter a demarcated zone prior to occurrence on an event based at least on the velocity and the first location; and in response to determining that the first traversing unit is likely to enter the demarcated zone prior to the occurrence of the event:

determining, by the processor, a target velocity for the first traversing unit to enable the first traversing unit to enter the demarcated zone; and transmitting, by the processor and to the first traversing unit through one or more wireless computer networks, data indicative of the target velocity to enable the first traversing unit to travel according to the target velocity.

2. The computer-implemented method of claim 1, wherein the event is a likely entry of a second traversing unit in the demarcated zone.

3. The computer-implemented method of claim 1, wherein the target velocity enables the first traversing unit to enter the demarcated zone before entry of a second traversing unit in the demarcated zone.

4. The computer-implemented method of claim 1, wherein the one or more wireless computer networks comprises a vehicle ad hoc network.

* * * * *